(12) United States Patent
Hagimoto et al.

(10) Patent No.: US 8,146,353 B2
(45) Date of Patent: Apr. 3, 2012

(54) EXHAUST PURIFICATION DEVICE FOR INTERNAL COMBUSTION ENGINE, AND EXHAUST CONTROL DEVICE AND EXHAUST CONTROL METHOD FOR INTERNAL COMBUSTION ENGINE

(75) Inventors: Taiga Hagimoto, Susono (JP); Norihisa Nakagawa, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 604 days.

(21) Appl. No.: 12/153,522

(22) Filed: May 20, 2008

(65) Prior Publication Data

US 2008/0289322 A1    Nov. 27, 2008

(30) Foreign Application Priority Data

May 22, 2007    (JP) .................................. 2007-135810

(51) Int. Cl.
*F01N 3/24*    (2006.01)
(52) U.S. Cl. .......................................... 60/322; 60/288
(58) Field of Classification Search ............... 60/287, 60/288, 291, 292, 322
See application file for complete search history.

(56) References Cited

U.S. PATENT DOCUMENTS

| | | | | |
|---|---|---|---|---|
| 5,331,810 | A | * | 7/1994 | Ingermann et al. ............. 60/322 |
| 5,655,362 | A | * | 8/1997 | Kawajiri et al. ................. 60/276 |
| 2009/0282807 | A1 | * | 11/2009 | Rioli et al. ....................... 60/276 |

FOREIGN PATENT DOCUMENTS

| | | |
|---|---|---|
| JP | A-5-256130 | 10/1993 |
| JP | A-6-159045 | 6/1994 |
| JP | A-6-346724 | 12/1994 |
| JP | A-9-125941 | 5/1997 |
| JP | A-11-132033 | 5/1999 |
| JP | A-2000-179329 | 6/2000 |
| JP | A-2004-44509 | 2/2004 |
| JP | A-2006-274910 | 10/2006 |
| JP | A-2006-283611 | 10/2006 |

OTHER PUBLICATIONS

Apr. 14, 2009 Office Action issued in Japanese Patent Application No. 2007-135810 (with translation).

* cited by examiner

*Primary Examiner* — Thomas Denion
*Assistant Examiner* — Jonathan Matthias
(74) *Attorney, Agent, or Firm* — Oliff & Berridge, PLC (57) ABSTRACT

An exhaust purification device includes a front catalyst arranged in an exhaust system of the internal combustion engine that is longitudinally mounted in a vehicle, a rear catalyst arranged in the exhaust system downstream of the front catalyst, and a bypass pipe that communicates with the exhaust passage of the exhaust system upstream of the front catalyst, communicates with the exhaust passage between the front catalyst and the rear catalyst, and is arranged at a position that is spaced apart in a direction perpendicular to the vibration direction of the exhaust system.

4 Claims, 7 Drawing Sheets

EXHAUST PURIFICATION DEVICE 100B : 11B,12,15B,16

FIG. 4

EXHAUST PURIFICATION DEVICE 100C :11C,12,17A

EXHAUST PURIFICATION DEVICE 100E : 11C, 12, 17B

FIG. 7

EXHAUST PURIFICATION DEVICE 100F : 11F, 12, 17A

FIG.8

| STATE | 1 | 2 | 3 | 4 | 5 | |
|---|---|---|---|---|---|---|
| OUTPUT OF FRONT OXYGEN SENSOR 23 | L | R | R | (L) | R | R: RICH<br>L: LEAN |
| OUTPUT OXYGEN SENSOR 22 | (L | L | R) | R | (L) | |
| AIR-FUEL RATIO F/B CONTROL | R | R | L | R | R | |

USE FRONT OXYGEN SENSOR 23

USE OXYGEN SENSOR 22 (left)

USE OXYGEN SENSOR 22 (right)

↑ SWITCH INFLOW DIRECTION

EXHAUST PURIFICATION DEVICE FOR INTERNAL COMBUSTION ENGINE, AND EXHAUST CONTROL DEVICE AND EXHAUST CONTROL METHOD FOR INTERNAL COMBUSTION ENGINE

INCORPORATION BY REFERENCE

The disclosure of Japanese Patent Application No. 2007-135810 filed on May 22, 2007 including the specification, drawings and abstract is incorporated herein by reference in its entirety.

BACKGROUND OF THE INVENTION

1. Field of the Invention

The present invention relates to an exhaust purification device for an internal combustion engine, and an exhaust control device and exhaust control method for an internal combustion engine.

2. Description of Related Art

Conventional exhaust purification devices for an internal combustion engines generally include two or more catalysts arranged in the exhaust system of the internal combustion engine. In such exhaust purification devices, a front catalyst is usually provided in the exhaust passage near the internal combustion engine, and a rear catalyst placed in the exhaust passage downstream of the front catalyst. The temperature of the front catalyst is quickly raised to an activation temperature, thereby making it possible to enhance the efficiency of exhaust purification at cold start of the engine. At the same time, in purifying exhaust with the front catalyst at this time, it is also important to keep the front catalyst in a state capable of purifying exhaust.

In this regard, to keep the front catalyst in a state capable of purifying exhaust, it is necessary to keep the amount of oxygen occluded in the front catalyst at an appropriate amount In this connection, there is known a technique whereby a gas sensor (for example, an A/F sensor) is arranged upstream of the front catalyst, and the output of this gas sensor is reflected on the amount of fuel injection, thus applying feedback control to the air/fuel ratio so that the air/fuel ratio of exhaust flowing into the front catalyst becomes a target air/fuel ratio (for example, the stoichometric air/fuel ratio). According to this technique, it is unlikely that the front catalyst will occlude or release an excessive amount of oxygen, thereby making it possible to keep the front catalyst in a state capable of purifying exhaust.

However, if the air/fuel ratio is feedback controlled to purify exhaust with the front catalyst as mentioned above, almost no oxygen is contained in the gas flowing out from the front catalyst. That is, the gas flowing out from the front catalyst becomes a gas whose air/fuel ratio is rich (hereinafter, "rich gas"). When the rich gas flows into the rear catalyst, stored oxygen is desorbed from the rear catalyst. Thus, continuous inflow of rich gas into the rear catalyst causes the amount of oxygen occluded in the rear catalyst to become 0 (zero), resulting in a decrease in the exhaust purification efficiency of the rear catalyst (rich poisoning).

To avoid rich poisoning the rear catalyst, a sub-feedback control of the air/fuel ratio, in addition to the above-mentioned feedback control, may be executed whereby the output of a gas sensor (for example, an oxygen sensor) provided in the exhaust passage downstream of the front catalyst is reflected on the fuel injection amount so that the air/fuel ratio of gas discharged from the front catalyst reaches a target air/fuel ratio (for example, the stoichometric air/fuel ratio).

According to this technique, by executing the sub-feedback control, the air/fuel ratio of gas flowing into the rear catalyst is maintained near the stoichometric air/fuel ratio, thereby making it possible to restrain rich poisoning of the rear catalyst. However, even if the above-mentioned sub-feedback control is executed, the front catalyst must purify the exhaust gas during cold start of the engine. Thus, for the engine operation as a whole, more rich gas is likely to flow into the rear catalyst. This may also result in rich poisoning of the rear catalyst.

In order to maintain the activity of the rear catalyst in this case, gas having a lean air/fuel ratio (hereinafter, "lean gas") must be circulated to the rear catalyst as appropriate to increase the amount of oxygen occluded in the rear catalyst. In this regard, if a bypass pipe that directs a portion of exhaust to flow into the rear catalyst while bypassing the front catalyst, and a valve that opens up and blocks up the flow path of this bypass pipe are installed, lean gas may be supplied to the rear catalyst as appropriate. It should be noted that with regard to such a bypass pipe, techniques considered as being related to the present invention are described in, for example, Japanese Patent Application Publication No. 2004-44509 (JP-A-2004-44509) and Japanese Patent Application Publication No. 11-132033 (JP-A-11-132033). Other techniques considered as being related to the present invention are described in Japanese Patent Application Publication No. 2006-283611 (JP-A-2006-283611), Japanese Patent Application Publication No. 2006-274910 (JP-A-2006-274910), Japanese Patent Application Publication No. 9-125941 (JP-A-9-125941), and Japanese Patent Application Publication No. 6-346724 (JP-A-6-346724).

Figure 10A:
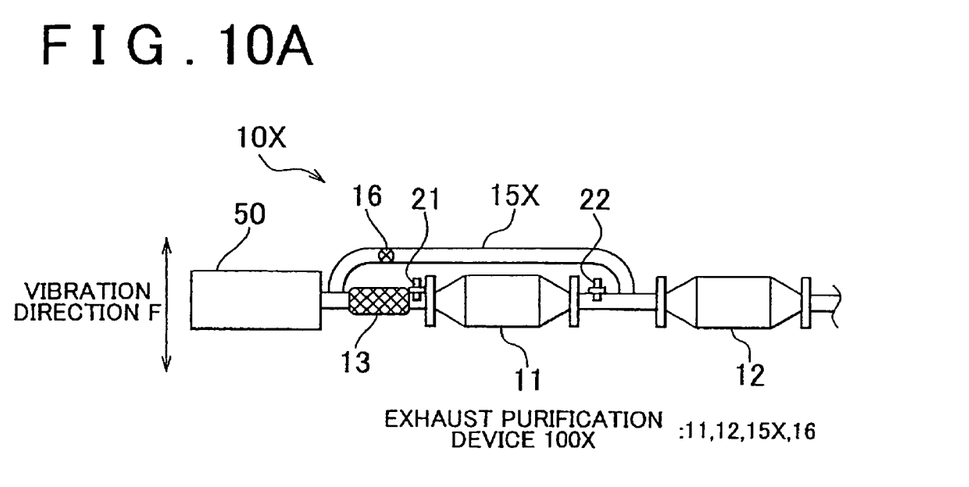
FIGS. 10A and 10B are views schematically showing an exhaust purification device of the related art together with an internal combustion engine.
Figure 10B:
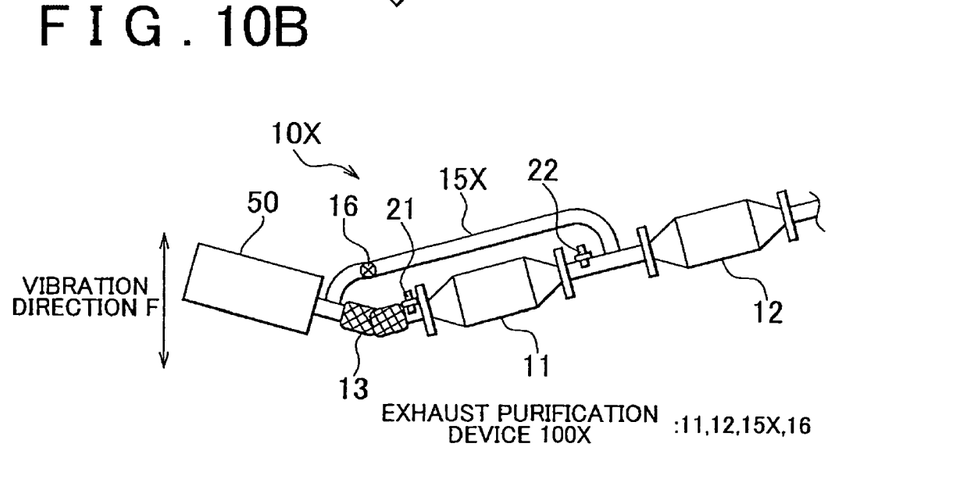

FIGS. 10A and 10B are views showing a typical exhaust purification device for an internal combustion engine (hereinafter, simply referred to as exhaust purification device) 100X which includes a front catalyst and a rear catalyst, together with an internal combustion engine 50. It should be noted that in FIGS. 10A and 10B, the internal combustion engine 50 is longitudinally mounted in a vehicle (not shown), and FIGS. 10A and 10B are views of the exhaust purification device 100X as seen from above the vehicle. In the case where the internal combustion engine 50 is longitudinally mounted in the vehicle, the internal combustion engine 50 is typically subjected to large vibration in the horizontal direction as shown in the drawing. On the other hand, a flexible pipe 13 is typically arranged in an exhaust system 10X so that, when the internal combustion engine 50 vibrates, the flexible pipe 13 is deformed, thus preventing bending from occurring in the exhaust pipe or the like. In contrast, from the viewpoint of easy vehicle mounting, a bypass pipe 15X is typically arranged at a position that is horizontally spaced apart from the exhaust passage of the exhaust system 10X.

However, if the internal combustion engine 50 mainly vibrates in the horizontal direction, as described above, the arrangement of the bypass pipe 15X at a position that is horizontally spaced apart from the exhaust passage of the exhaust system 10X may result in bending deformation of the bypass pipe 15X due to the vibration of the internal combustion engine. In this case, it is difficult to absorb variations in the length of the bypass pipe 15A due to vibration, which may cause significant bending of the bypass pipe 15A, as shown in FIG. 10B. As long as such bending deformation due to vibration occurs, it is difficult to deal with the problem of rich poisoning by the provision of the bypass pipe 15X. On the other hand, the provision of the bypass pipe 15X leads to an increase in the number of parts for the vehicle as a whole, which may be disadvantageous in terms of cost. Hence, also desired is a technique that makes it possible to restrain rich poisoning by supplying lean gas to the rear catalyst 12 without providing the above-mentioned bypass pipe 15X.

SUMMARY OF THE INVENTION

The present invention provides an exhaust purification device for an internal combustion engine, and an exhaust control device and exhaust control method that restrains rich poisoning of a rear catalyst.

A first aspect of the present invention relates to an exhaust purification device for an internal combustion engine. The exhaust purification device includes: a front catalyst arranged in an exhaust passage of an exhaust system of the internal combustion engine that is longitudinally mounted in a vehicle; a rear catalyst arranged in series with the front catalyst, in the exhaust passage of the exhaust system downstream of the front catalyst; and a bypass pipe that communicates with the exhaust passage of the exhaust system upstream of the front catalyst, and communicates with the exhaust passage of the exhaust system between the front catalyst and the rear catalyst, the bypass pipe being arranged at a position that is spaced apart from the exhaust passage of the exhaust system in a direction perpendicular to a vibration direction of the exhaust system that vibrates by a vibration of the internal combustion engine.

According to the above-mentioned aspect, by arranging the bypass pipe as mentioned above, vibration of the internal combustion engine acts to produce, for example, elongation in the bypass pipe. Thus, according to this aspect, variations in the length of the bypass pipe due to vibration are readily accommodated, and it is possible to prevent large bending from occurring in the bypass pipe. This makes it possible to provide the bypass pipe to restrain rich poisoning of the rear catalyst.

A second aspect of the present invention relates to an exhaust control device for an internal combustion engine. The exhaust control device includes: an exhaust purification device that includes a front catalyst provided in an exhaust system of the internal combustion engine so that gas from the internal combustion engine flows toward the front catalyst from two directions, a rear catalyst provided in the exhaust system downstream of the front catalyst, and an inflow direction switching device that switches a direction of gas flowing into the front catalyst; a first gas sensor provided in the exhaust system upstream of the front catalyst; a feedback control device that calculates a fuel injection amount of the internal combustion engine based on an output of the first gas sensor; a second gas sensor provided in the exhaust system downstream of the front catalyst and upstream of the rear catalyst; a sub-feedback control device that corrects the calculated fuel injection amount based on an output of the second gas sensor; and a first exhaust control device that controls the inflow direction switching device so as to switch the direction of gas flowing into the front catalyst to an opposite direction when the output of the second gas sensor changes from a rich output to a lean output while an air/fuel ratio of the internal combustion engine is feedback controlled by the feedback control device and the sub-feedback control device.

The configuration according to the above-mentioned aspect is designed by focusing attention on the way oxygen is released from the front catalyst while feedback control and sub-feedback control are performed. According to the above-mentioned aspect, by switching the direction of gas flowing into the front catalyst to the opposite direction as mentioned above, oxygen can be supplied to the rear catalyst located downstream of the front catalyst. That is, according to the above-mentioned aspect, oxygen can be supplied to the rear catalyst without providing the bypass pipe, thereby making it possible to restrain rich poisoning of the rear catalyst.

A third aspect of the present invention relates to an exhaust control method for an internal combustion engine including: an exhaust purification device, which has a front catalyst provided in an exhaust system of the internal combustion engine so that gas from the internal combustion engine flows in from two directions; a rear catalyst provided in a portion of the exhaust system downstream of the exhaust system; and an inflow direction switching device that switches a direction of gas flowing into the front catalyst; a first gas sensor provided upstream of the front catalyst; and a second gas sensor provided in the exhaust system between the front catalyst and the rear catalyst. This exhaust control method includes: calculating a fuel injection amount of the internal combustion engine based on an output of the first gas sensor; correcting the calculated fuel injection amount based on an output of the second gas sensor; and controlling the inflow direction switching device to switch the direction of gas flowing into the front catalyst to an opposite direction when an output of the second gas sensor changes from a rich output to a lean output.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EXAMPLE EMBODIMENTS

Hereinafter, the first to sixth embodiments of the present invention will be described in detail with reference to the drawings.

Figure 1:
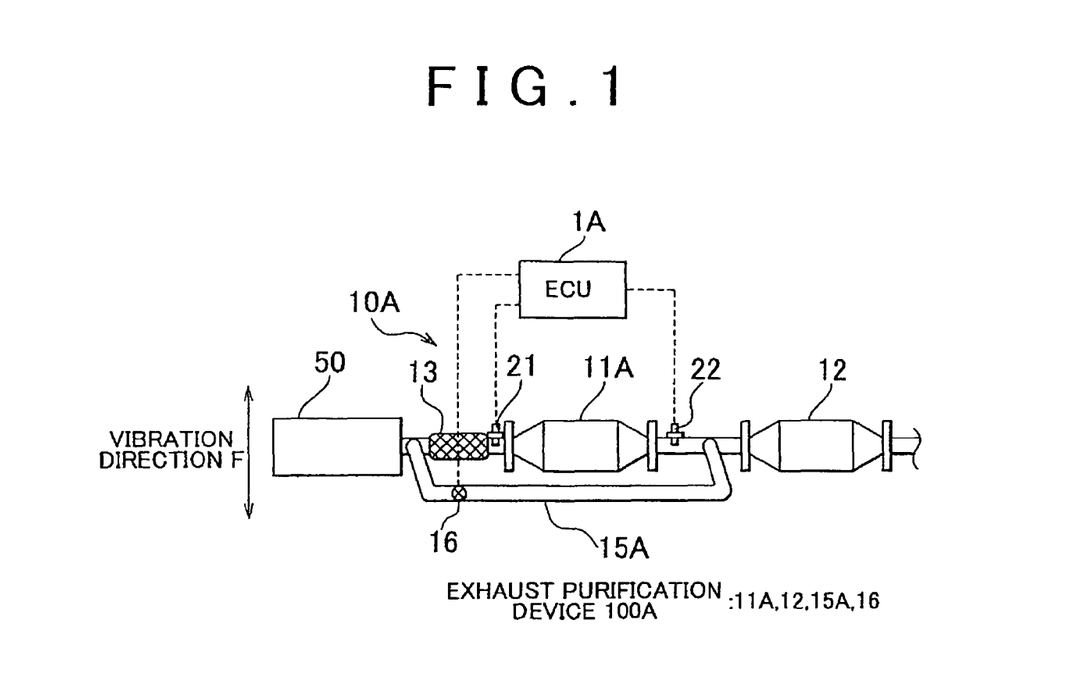
FIG. 1 is a view schematically showing an exhaust purification device according to the first embodiment of the present invention, together with an internal combustion engine.

FIG. 1 is a schematic view of an exhaust purification device 100A according to the first embodiment of the present invention together with an internal combustion engine 50. It should be noted that FIG. 1 is a view of the exhaust purification device 100A as seen from above a vehicle (not shown). An exhaust system 10A of the internal combustion engine 50 includes a front catalyst 11A, a rear catalyst 12, and a flexible pipe 13. The rear catalyst 12 is provided in the exhaust passage of the exhaust system 10A, downstream of the front catalyst, and is provided in series with the front catalyst 11A. The front catalyst 11A and the rear catalyst 12 are configured to purify exhaust, and both have an oxygen occlusion capacity. A three-way catalyst may be employed, or a combination of NOx occlusion catalyst and three-way catalyst may be employed as the front catalyst 11A and the rear catalyst 12.

An A/F sensor 21 is provided in the exhaust passage, upstream of the front catalyst 11A, and an oxygen sensor 22 is provided in the exhaust passage between the front catalyst 11A and the rear catalyst 12. The A/F sensor 21 is configured to linearly detect the air/fuel ratio based on the concentration of oxygen in exhaust gas, and the oxygen sensor 22 is configured to detect whether the air/fuel ratio is richer or leaner than stoichiometric based on the concentration of oxygen in exhaust gas.

The A/F sensor 21 and the oxygen sensor 22 are both electrically connected to an ECU (Electronic Control Unit) 1A. The ECU 1A includes a microcomputer having a CPU (Central Processing Unit) (not shown), a ROM (Read Only Memory), and a RAM (Random Access Memory), an input/output circuit, and so forth. The ECU 1A is configured to mainly control the internal combustion engine 50, and also controls a valve 16 in this embodiment. The valve 16 is thus electrically connected to the ECU 1A. It should be noted that other various target control objects may be electrically connected to the ECU 1A. Further, in addition to the A/F sensor 21 and the oxygen sensor 22, various sensors or switches, such as a coolant temperature sensor and an ignition switch (not shown), may also be connected to the ECU 1A.

The ROM stores programs, nap data, and so forth that describe various processes to be executed by the CPU. In this embodiment, in addition to an internal combustion engine control program, the ROM also stores a feedback control that corrects the fuel injection amount of the internal combustion engine 50 in accordance with the output of the A/F sensor 21, a sub-feedback control that further corrects the corrected fuel injection amount of the internal combustion engine 50 based on the output of the oxygen sensor 22, and so forth. It should be noted that these programs may be integrally combined with the internal combustion engine control program. In this embodiment, the feedback control program is specifically designed to correct the fuel injection amount of the internal combustion engine 50 based on the output of the A/F sensor 21 so that the exhaust air/fuel ratio upstream of the front catalyst 11A reaches a target air/fuel ratio (in this example 14.6, which is the stoichiometric air/fuel ratio). Further, in this embodiment, the sub-feedback control program is specifically designed to further correct the fuel injection amount as corrected by the feedback control program so that the output of the oxygen sensor 22 reaches a predetermined value (in this example 0.5 V, which is equivalent to the stoichiometric air/fuel ratio). Thus, the exhaust air/fuel ratio downstream of the front catalyst 11A reaches the target air/fuel ratio.

The ECU 1A is also configured to execute the feedback control and the sub-feedback control in accordance with the feedback control program and the sub-feedback control program mentioned above. A feedback control device may be implemented by the microcomputer and the feedback control program, and a sub-feedback control device may be implemented by the microcomputer and the sub-feedback control program.

A bypass pipe 15A is provided in the exhaust system 10A. One end of the bypass pipe 15A is connected to the exhaust passage of the exhaust system 10A, upstream of the front catalyst 11A. More specifically, the one end of the bypass pipe 15A is connected to the exhaust passage further upstream of the flexible pipe 13. The other end of the bypass pipe 15A is connected to the exhaust passage of the exhaust system 10A between the front catalyst 11A and the rear catalyst 12. With the exhaust system 10A connected in this manner, the bypass pipe 15A communicates with the exhaust passage of the exhaust system 10A upstream of the front catalyst 11A, and communicates with the exhaust passage of the exhaust system 10A at a portion between the front catalyst 11A and the rear catalyst 12. Further, the valve 16 that regulates the flow path is arranged in the bypass pipe 15A.

The bypass pipe 15A is provided at a position that is spaced apart from the exhaust passage of the exhaust system 10A in a direction perpendicular to the vibration direction F of the internal combustion engine 50. In this embodiment, the vibration direction F of the internal combustion engine 50 is horizontal as shown in FIG. 1. In particular, the bypass pipe 15A is arranged at a position that is spaced apart from the exhaust passage of the exhaust system 10A in a substantially vertical direction (direction perpendicular to the plane of FIG. 1). It should be noted that in FIG. 1, the bypass pipe 15A is depicted three-dimensionally. Thus, in actuality, the bypass pipe 15A is positioned so as to overlap the exhaust system 10A when viewed from above the vehicle.

In this embodiment, the exhaust purification device 100A is implemented by the bypass pipe 15A, the front catalyst 11A, the rear catalyst 12, and the valve 16 arranged as described above. By arranging the bypass pipe 15A in the manner described above, vibration of the internal combustion engine 50 acts to produce, for example, elongation in the bypass pipe 15A. Thus, the exhaust purification device 100A makes it possible to readily absorb variations in the length of the bypass pipe 15A due to vibration, and also prevent the bypass pipe 15A from undergoing significant bending. That is, since the above-mentioned arrangement of the bypass pipe 15A can restrain occurrence of bending deformation, it is possible to provide the bypass pipe 15A to the exhaust system 10A. Thus, when the feedback control and the sub-feedback control are executed by the ECU 1A, lean gas is supplied to the rear catalyst 12 via the bypass pipe 15A to restrain rich poisoning of the rear catalyst 12.

Figure 2:
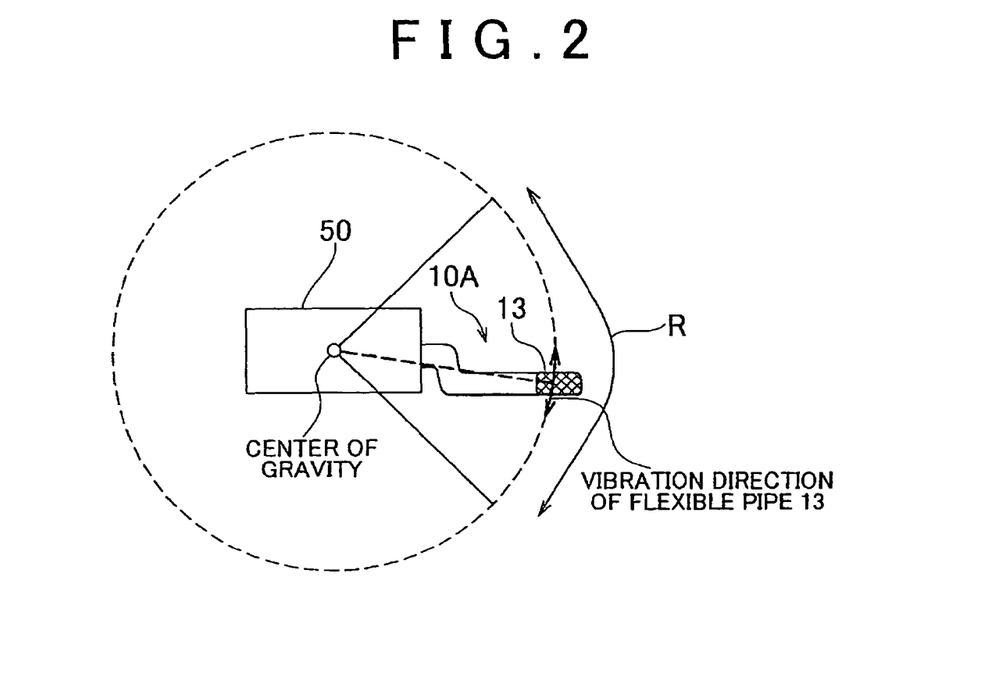
FIG. 2 is a view schematically showing a part of an exhaust system of the internal combustion engine.

Even if the internal combustion engine 50 is longitudinally mounted in a vehicle, the vibration direction F may not become horizontal, depending on the cylinder layout structure or the like of the internal combustion engine 50. FIG. 2 is a view schematically showing a part of the exhaust system 10A together with the internal combustion engine 50. It should be noted that FIG. 2 is a view of these components as seen from the side of the vehicle. For example, when the internal combustion engine 50 is a horizontally opposed engine, the vibration direction F is vertical instead. In this case, bending deformation of the bypass pipe 15A may be restrained by arranging the bypass pipe 15A at a position that is spaced apart from the exhaust passage of the exhaust system 10A in a substantially horizontal direction. That is, as in the first embodiment, by arranging the bypass pipe 15A in a direction substantially perpendicular to the vibration direction F, it is possible to restrain bending deformation of the bypass pipe 15A.

On the other hand, even if the vibration direction F is the same, the orientation of the bypass pipe 15A may be changed depending on the arrangement of the exhaust system 10A. This is because the direction in which the flexible pipe 13 vibrates in accordance with the vibration of the internal combustion engine 50 may vary depending on the arrangement of the exhaust system 10A. For example, as shown in FIG. 2, the flexible pipe 13 is located at a position where vibration is larger in the vertical direction than in the horizontal direction (position within a predetermined range R shown in FIG. 2) in relation to the center of gravity of the internal combustion engine 50. In this case, bending deformation of the bypass pipe 15A may be restrained more effectively by arranging the bypass pipe 15A at a position that is horizontally, rather than vertically, spaced apart from the exhaust passage of the exhaust system 10A. Also, the bypass pipe 15A does not have to be arranged in a substantially horizontal direction with respect to the exhaust passage of the exhaust system 10A but may be arranged as appropriate in accordance with the position of the flexible pipe 13 (in other words, the vibration direction of the flexible pipe 13).

In contrast, consider a case where the flexible pipe 13 is located at a position where vibration becomes larger in the horizontal direction than in the vertical direction in relation to the center of gravity of the internal combustion engine 50, due to how the exhaust system 10A is arranged. In this case, even if the vibration direction F of the internal combustion engine 50 is vertical, it may be possible to restrain bending deformation of the bypass pipe 15A more effectively by arranging the bypass pipe 15A at a position that is vertically, rather than horizontally, spaced apart from the exhaust passage of the exhaust system 10A. Also, the bypass pipe 15A doe not have to be arranged in a substantially vertical direction but may be arranged as appropriate in accordance with the position of the flexible pipe 13 (in other words, the vibration direction of the flexible pipe 13).

The fact that it may be preferable to change the arrangement orientation of the bypass pipe 15A in accordance with the position of the flexible pipe 13 relative to the center of gravity of the internal combustion engine 50 also holds true for cases such as when the vibration direction F is horizontal. That is, in accordance with the typical arrangement of the exhaust system, the bypass pipe 15A may be arranged at a position that is spaced apart from the exhaust passage of the exhaust system 10A in a direction perpendicular to the vibration direction F. However, the bypass pipe 15A may be arranged at a position that is spaced apart from the exhaust passage of the exhaust system 10A in a direction parallel to the vibration direction F, depending on the position of the flexible pipe 13 relative to the center of gravity of the internal combustion engine 50.

In this regard, the bypass pipe 15A may be provided at a position that is spaced apart from the exhaust passage of the exhaust system 10A in a direction substantially perpendicular to a direction in which vibration of the flexible pipe 13 is greatest, in accordance with the position of the flexible pipe 13 (in other words, the vibration direction of the flexible pipe 13). According to the configuration described above, it is possible to realize the exhaust purification device 100A that restrains rich poisoning of the rear catalyst 12.

Figure 3:
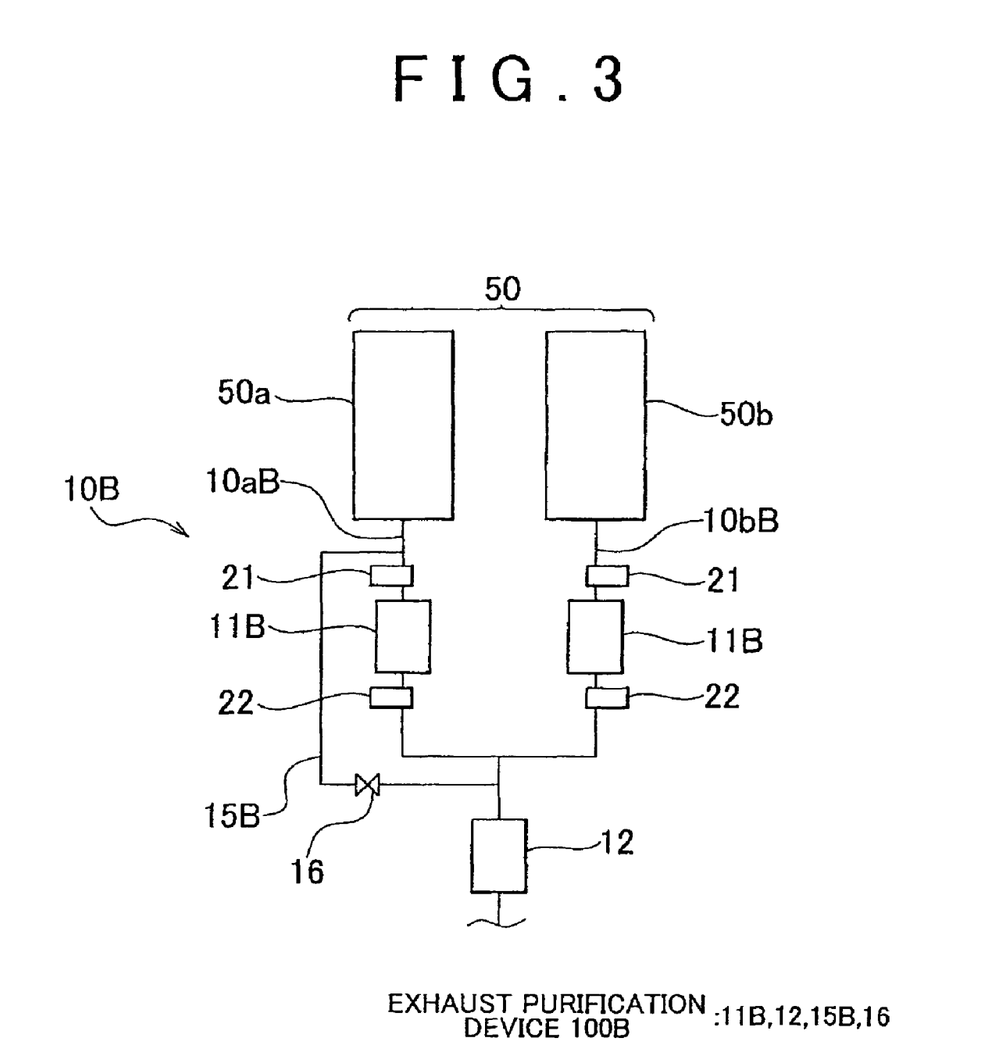
FIG. 3 is a view schematically showing an exhaust purification device according to the second embodiment of the present invention, together with an internal combustion engine.

FIG. 3 is a schematic view of an exhaust purification device 100B according to the second embodiment of the present invention together with the internal combustion engine 50. In this embodiment, the internal combustion engine 50 has a V configuration. Accordingly, the exhaust system 10B differs from the exhaust system 10A of the first embodiment in that the exhaust system 10B is branched out into exhaust systems 10aB, 10bB for each respective bank 50a, 50b, that is, for each respective cylinder groups of the internal combustion engine 50, and the front catalyst 11B is provided in each branched exhaust system 10aB, 10bB. Further, accordingly, the exhaust system 10B differs from the exhaust system 10A in the first embodiment in that the A/F sensor 21 is arranged in the exhaust passage upstream of each front catalyst 11B, and that the oxygen sensor 22 is provided in the exhaust passage downstream of each front catalyst 11B and upstream of the rear catalyst 12.

Although not shown, an ECU 1B according to the second embodiment is substantially the same as the ECU 1A in that the ECU 1B performs feedback control and sub-feedback control, but differs from the ECU 1A in that the ECU 1B further stores a cylinder suspend operation program in the ROM. Specifically, the internal combustion engine 50 suspends the operation of the cylinder group of the cylinder bank 50b during the cylinder suspend operation, under the control of the ECU 1B. Thus, during cylinder suspend operation, the internal combustion engine 50 operates only with the cylinder group of the bank 50a.

A bypass pipe 15B is arranged at a position that is vertically spaced apart from the exhaust passage of the exhaust system 10aB. The valve 16 for opening up and blocking up the flow path is arranged in the bypass pipe 15B. Further, in this embodiment, one end of the bypass pipe 15B is connected to the exhaust passage upstream of the front catalyst 11B that is arranged in the exhaust system 10aB, of the exhaust systems 10aB, 10bB, which is operated during the cylinder suspend operation. The other end of the bypass pipe 15B is connected to the exhaust passage between the front catalyst 11B and the rear catalyst 12. In this state, the bypass pipe 15B communicates with the exhaust passage of the exhaust system 10aB upstream of the front catalyst 11B on the side of the cylinder group that is operated during the cylinder suspend operation, and communicates with the exhaust passage of the exhaust system 10B between the front catalyst 11B and the rear catalyst 12.

In this embodiment, the exhaust purification device 100B includes the bypass pipe 15B, the front catalysts 11B, the rear catalyst 12, and the valve 16 arranged as mentioned above. By providing the bypass pipe 15B arranged as mentioned above, a portion of the exhaust gas may be diverted to flow into the rear catalyst 12 even during the cylinder suspend operation. Thus, by opening the valve 16 during operation of the internal combustion engine 50, a portion of exhaust may be diverted into the rear catalyst 12 at all times. Therefore, it is possible to restrain rich poisoning of the rear catalyst 12. According to the configuration described above, it is possible to realize the exhaust purification device 100B that can restrain rich poisoning of the rear catalyst 12.

Figure 4:
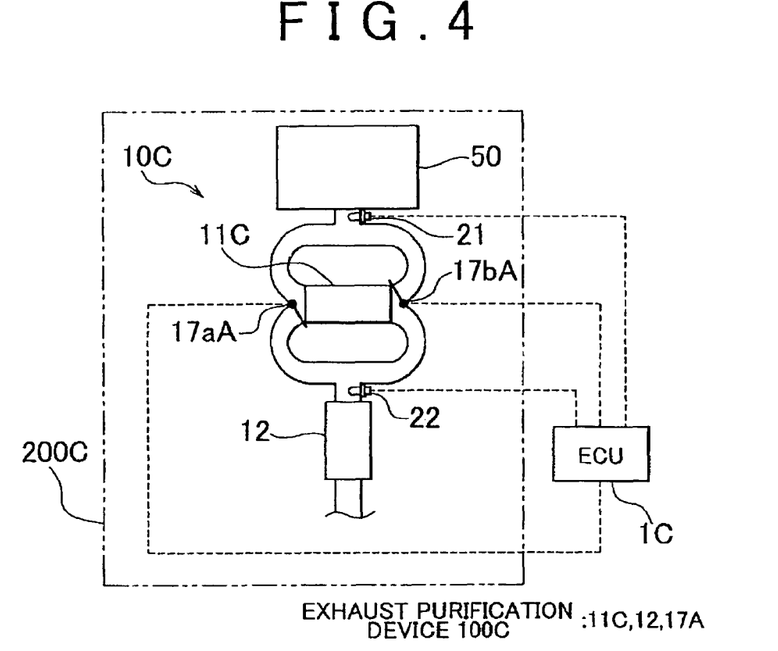
FIG. 4 is a view schematically showing an exhaust control device according to the third embodiment of the present invention as implemented by an ECU, together with an internal combustion engine.

FIG. 4 is a schematic view of an exhaust control device according to the third embodiment of the present invention as implemented by an ECU 1C, together with an internal combustion engine system 200C. The internal combustion engine system 200C has an exhaust system 10C including an exhaust purification device 100C, and the internal combustion engine 50. A front catalyst 11C and the rear catalyst 12 are arranged in the exhaust system 10C. Further, the exhaust pipe of the exhaust system 10C is configured to allow gas discharged from the internal combustion engine 50 to flow into the front catalyst 11C from two directions, and to allow gas flowing out from the front catalyst 11C to flow into the rear catalyst 12. Further, in the exhaust system 10C, inflow direction switching valves 17aA and 17bA for switching the direction of gas flowing into the front catalyst 11C are respectively arranged near gas inflow/outflow portions at opposite ends of the front catalyst 11C.

The inflow direction switching valve 17aA opens the exhaust passage downstream of the front catalyst 11C when blocking the exhaust passage upstream of the front catalyst 11C, and opens the exhaust passage upstream of the front catalyst 11C when blocking the exhaust passage downstream of the front catalyst 11C. The inflow direction switching valve 17bA is configured in the same manner as the inflow direction switching valve 17aA. Further, the inflow direction switching valves 17aA and 17bA (hereinafter, also generically referred to as inflow direction switching valves 17A) are configured such that when one of the inflow direction switching valves 17aA and 17bA opens the exhaust passage upstream of the front catalyst 11C, the other opens the exhaust passage downstream of the front catalyst 11C, under the control of the ECU IC. Thus, the direction of gas flowing into the front catalyst 11C is switched. It should be noted that the operations of the inflow direction switching valves 17A may be mechanically coupled to each other, for example, to allow the direction of gas flowing into the front catalyst 11C to be switched.

In addition, the A/F sensor 21 of the exhaust system 10C is provided in the exhaust passage upstream of the front catalyst 11C. Further, the oxygen sensor 22 of the exhaust system 10C is provided in the exhaust passage downstream of the front catalyst 11C and upstream of the rear catalyst 12. In this embodiment, the exhaust purification device 100C is implemented by the front catalyst 11C, which is arranged in the exhaust system 10C to allow inflow of gas from both directions as described above, the rear catalyst 12; and the inflow direction switching valves 17A.

The ECU 1C is the same as the ECU 1A according to the first embodiment, except that the ECU 1C further stores the following programs in the ROM: a program for inflow direction switching valve control, which is used for controlling the inflow direction switching valves 17A so as to switch the direction of gas flowing into the front catalyst 11C; and a first exhaust control program for controlling the inflow direction switching valves 17A so as to switch the direction of gas flowing into the front catalyst 11C to the opposite direction when the output of the oxygen sensor 22 changes from a rich output to a lean output (that is, when the output flips to lean) while the air/fuel ratio is feedback controlled by the feedback control device and the sub-feedback control device. It should be noted that the first exhaust control program may be configured to control the inflow direction switching valves 17A to switch the direction of gas flowing into the front catalyst 11C to the opposite direction when the feedback control of the air/fuel ratio shifts from lean control to rich control, instead of when the output flips to lean, for example. In this embodiment, a first exhaust control device may be implemented by the microcomputer and the first exhaust control program.

Figure 5:
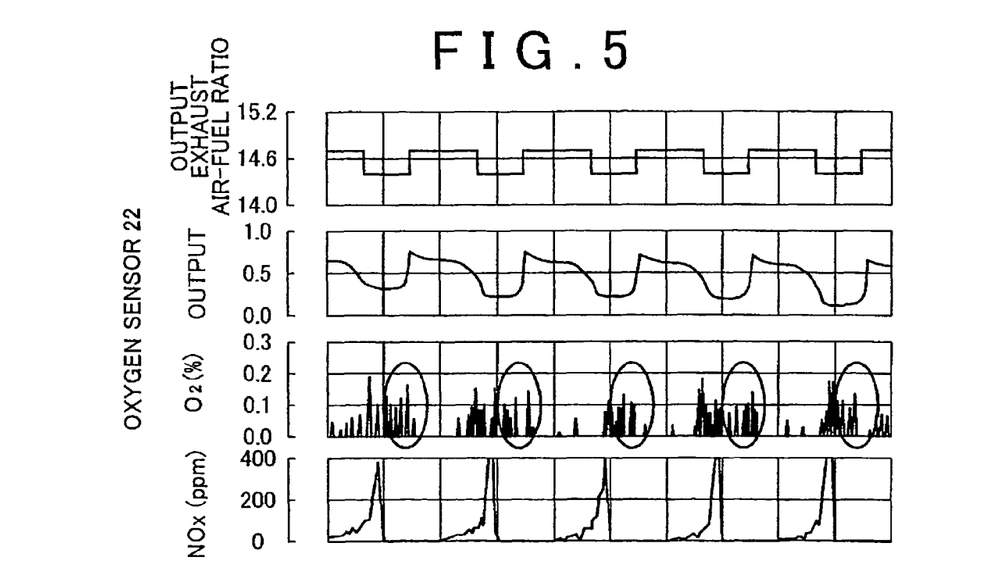
FIG. 5 is a diagram showing changes in various parameters while feedback control and sub-feedback control are performed.

FIG. 5 is a diagram showing changes in various parameters while the feedback control and the sub-feedback control are executed. FIG. 5 shows, as such various parameters, the exhaust air/fuel ratio based on the output of the A/F sensor 21, the output of the oxygen sensor 22, the concentration of oxygen contained in the gas discharged from the front catalyst 11C, and the amount of NOx contained in the gas discharged from the front catalyst 11C. The oxygen sensor 22 outputs 0.5 V when the air/fuel ratio of the exhaust gas is at the stoichiometric air/fuel ratio. If the oxygen sensor 22 outputs less than 0.5 V the air/fuel ratio is lean (hereinafter, this will be referred to as "lean output"). Alternatively, if the oxygen sensor 22 outputs more than 0.5 V the air/fuel ratio is rich (hereinafter, this will be referred to as "lean output"). As shown in FIG. 5, when the rear portion of the front catalyst 11C is lean, oxygen is discharged from the front catalyst 11C even after NOx has decreased. Thus, by controlling the inflow direction switching valves 17A to switch the direction of gas flowing into the front catalyst 11C to the opposite direction when the output of the oxygen sensor 22 changes to a lean output, oxygen may be supplied to the rear catalyst 12. According to the configuration described in the foregoing, the ECU 1C is able to restrain rich poisoning of the rear catalyst 12.

Although not shown, respective components according to the fourth embodiment of the present invention are the same as those of the third embodiment shown in FIG. 4, except that a front catalyst 11D is substituted for the front catalyst 11C, and an ECU 1D is substituted for the ECU 1C. In this embodiment, an exhaust control device is implemented by the ECU 1D. The front catalyst 11D is a front-highly-loaded catalyst with a larger amount of catalyst loaded on the front side (the flow direction switching valve 17aA side in this example). The catalyst may be quickly activated by quickly raising the temperature on the front side, thus achieving more effective exhaust purification. Accordingly, a second exhaust control program, which controls the inflow direction switching valves 17A so that exhaust gas flows into the front catalyst 11D from the front side (highly-loaded side) at cold start of the internal combustion engine 50, is stored in the ECU ID instead of ROM, as with the ECU 1C. In this embodiment, a second exhaust control device is implemented by the second exhaust control program and the microcomputer.

The inflow direction switching valves 17A are controlled by the ECU 1D so that when the coolant temperature is equal to or below a predetermined value (for example, 70□C) at engine start, this is regarded as a cold start, and the inflow direction switching valves 17A are switched to make gas flow into the front catalyst 11D from the front side. Because more heat is thus received from exhaust gas by the portion of the front catalyst 11D on the front side where the loading amount of catalyst is large, the portion where the loading amount of catalyst is large may be activated early through quick temperature elevation, thereby making it possible to reduce emissions early.

It should be noted that the second exhaust control program may be executed in preference over the first exhaust control program. That is, the second exhaust control device may be preferred over the first exhaust control device in controlling the inflow-direction switching device. Specifically, such preferential utilization may be limited to when certain conditions are satisfied, such as until a predetermined period of time elapses, or until warm-up is completed. The ECU 1D may further store in the ROM a third exhaust control program that controls the inflow direction switching valves 17A upon completion of warm-up of the internal combustion engine 50 to reverse the direction of gas flowing into the front catalyst 11D. In this case, a third exhaust control device is implemented by the third exhaust control program and the microcomputer.

In this case, as with the second exhaust control program, the third exhaust control program may be executed in preference over the first exhaust control program. That is, the third exhaust control device may be preferred over the first exhaust control device in controlling the inflow direction switching device. Specifically, such preferential utilization may be limited to when certain conditions are satisfied, for example, or after warm-up of the internal combustion engine 50 is completed (for example, after the coolant temperature becomes equal to or above a predetermined value). Conditions for which preferential utilization may be appropriate include predetermined conditions such as, for example, when the temperature of the front highly-loaded portion of the front catalyst 11D exceeds a predetermined temperature. This makes it further possible to protect the catalyst highly-loaded portion of the front catalyst 11D from high temperature exhaust gas, thereby preventing a decrease in the performance of the catalyst highly-loaded portion. The above-described configuration enables the ECU 1D to suitably restrain rich poisoning of the rear catalyst 12, and to further prevent a decrease in the performance of the catalyst highly-loaded portion.

Figure 6:
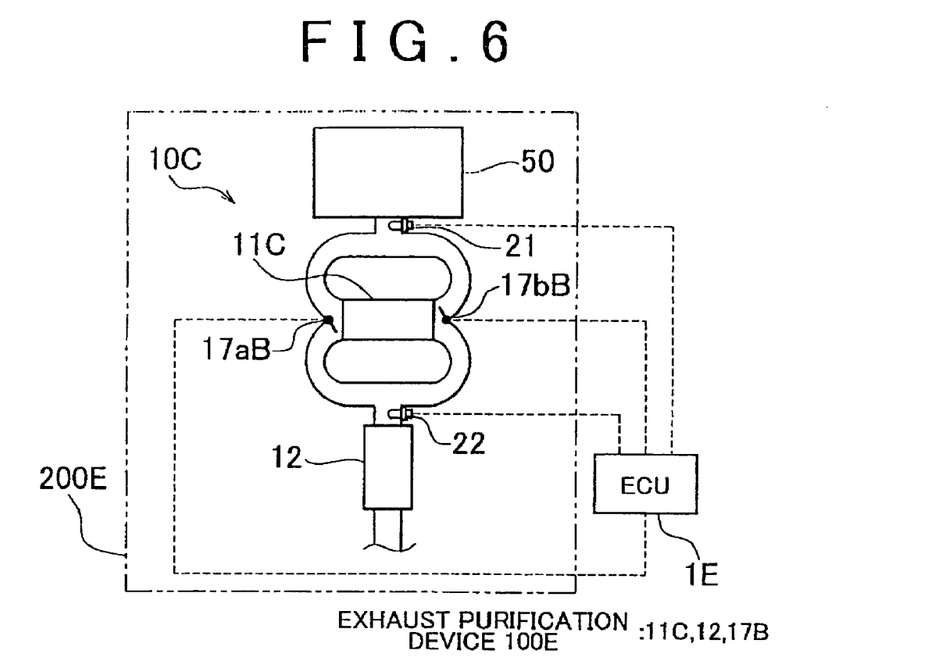
FIG. 6 is a view schematically showing an exhaust control device according to the fifth embodiment of the present invention as implemented by an ECU, together with an internal combustion engine.

FIG. 6 is a view schematically showing an exhaust control device according to the fifth embodiment of the present invention as realized by an ECU 1E, together with an internal combustion engine system 200E. As shown in FIG. 6, respective components according to this embodiment are the same as those of the third embodiment shown in FIG. 4, except that inflow direction switching valves 17B are substituted for the inflow direction switching valves 17A, and that the ECU 1E is substituted for the ECU 1C. The inflow direction switching valves 17B differ from the inflow direction switching valves 17A in that the inflow direction switching valves 17B allow gas to flow toward the downstream side while allowing gas to flow into the front catalyst 11C from two directions. It should be noted that in the third and fourth embodiments, the inflow direction switching valves 17A may be configured in the same manner as the inflow direction switching valves 17B.

In accordance with this configuration, the ECU 1E further stores, as opposed to the ROM of the ECU 1C, a fourth exhaust control program is stored in the ECU 1E instead of the ROM as with the ECU 1C. The fourth exhaust control program controls the inflow direction switching valves 17B to switch the direction of gas flowing into the first catalyst 11C so that gas can flow in from two directions, in accordance with fuel-cut control performed in the internal combustion engine 50. It should be noted that a fuel-cut control program constitutes a part of the internal combustion engine control program. It is also possible to further store the fourth exhaust control program in the ROM of the ECU 1D described above in the fourth embodiment. In this embodiment, a fourth exhaust control device may be implemented by the fourth exhaust control program and the microcomputer.

The inflow direction switching valves 17B are controlled by the ECU 1E to switch the direction of gas flowing into the front catalyst 11C to a direction in which gas can flow from two directions when the fuel-cut control is started. Further, the inflow direction switching valves 17B are controlled to maintain this state while fuel-cut control is performed. Because gas is allowed to flow toward the downstream side instead of flowing into the front catalyst 11C when the fuel-cut control is executed, the front catalyst 11C remains under a reducing atmosphere during the fuel-cut control, thereby making it possible to prevent a decrease in the performance of the front catalyst 11C. At the same time, a rich spike after fuel-cut control may be prevented. The ECU 1E may implement the above-described configuration to restrain rich poisoning of the second catalyst 11C, prevent a decrease in the performance of the first catalyst 11C, and prevent a rich spike after fuel-cut control.

Figure 7:
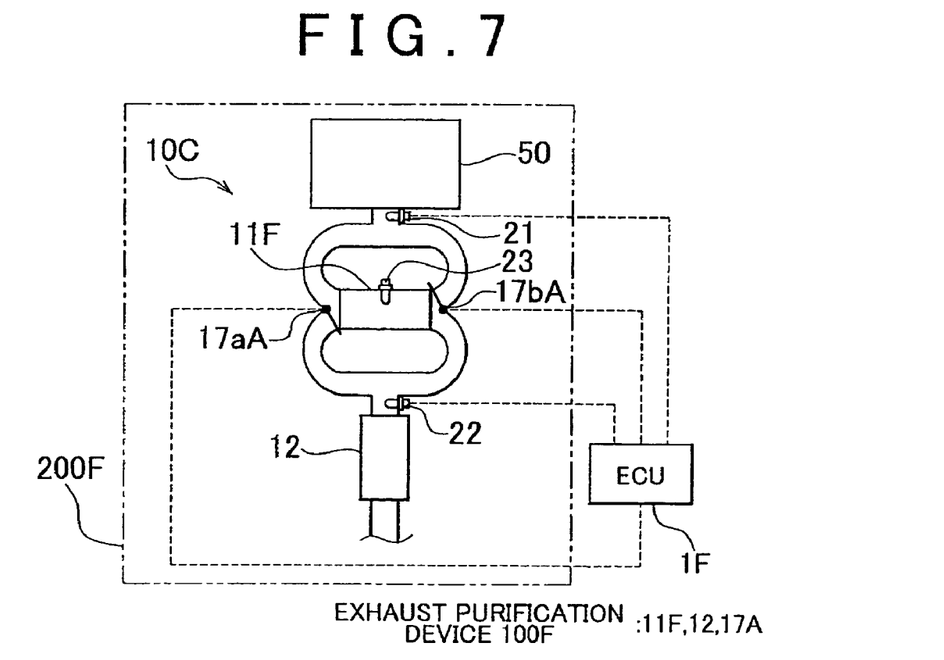
FIG. 7 is a view schematically showing an exhaust control device according to the sixth embodiment of the present invention as implemented by an ECU, together with an internal combustion engine.

FIG. 7 is a view schematically showing an exhaust purification device according to the sixth embodiment of the present invention as implemented by an ECU 1F, together with an internal combustion engine system 200F. As shown in FIG. 7, respective components according to this embodiment are the same as those of the third embodiment shown in FIG. 4, except that a front catalyst 11F is substituted for the front catalyst 11C, and that the ECU 1F is substituted for the ECU 1C. The front catalyst 11F is the same as the front catalyst 11C, except that an oxygen sensor 23 used for sub-feedback control is provided within the front catalyst 11F. To differentiate the oxygen sensor 23 from the oxygen sensor 22, hereinafter, the oxygen sensor 23 will be referred to as the front oxygen sensor 23.

In accordance with this configuration, the output switching program may be stored in the ECU 1F, instead of the ROM as with the ECU 1C. The output switching program is used to switch an output used for the sub-feedback control when the output of the upstream oxygen sensor 23 changes from a rich output to a lean output during lean control while the air/fuel ratio is feedback-controlled by the feedback control device and the sub-feedback control device, the output switching program switches the output that is used in the sub-feedback control. Accordingly, the sub-feedback control device uses the output of the upstream oxygen sensor 23 instead of the output of the oxygen sensor 22 to determine the fuel injection amount for the internal combustion engine 50. It should be noted that this output switching program may be configured as a part of the sub-feedback control program.

The ECU 1F further stores, as opposed to the ROM of the ECU 1C, a fifth exhaust control program that controls the inflow direction switching valves 17A to switch the direction of gas flowing into the front catalyst 11F to the opposite direction when the output of the front oxygen sensor 23 changes from a rich output to a lean output (that is, when the output flips to lean) during the lean control while the air/fuel ratio is feedback-controlled by the feedback control device and the sub-feedback control device. In this embodiment, a fifth exhaust control device may be implemented by the fifth exhaust control program and the microcomputer.

Figure 8:
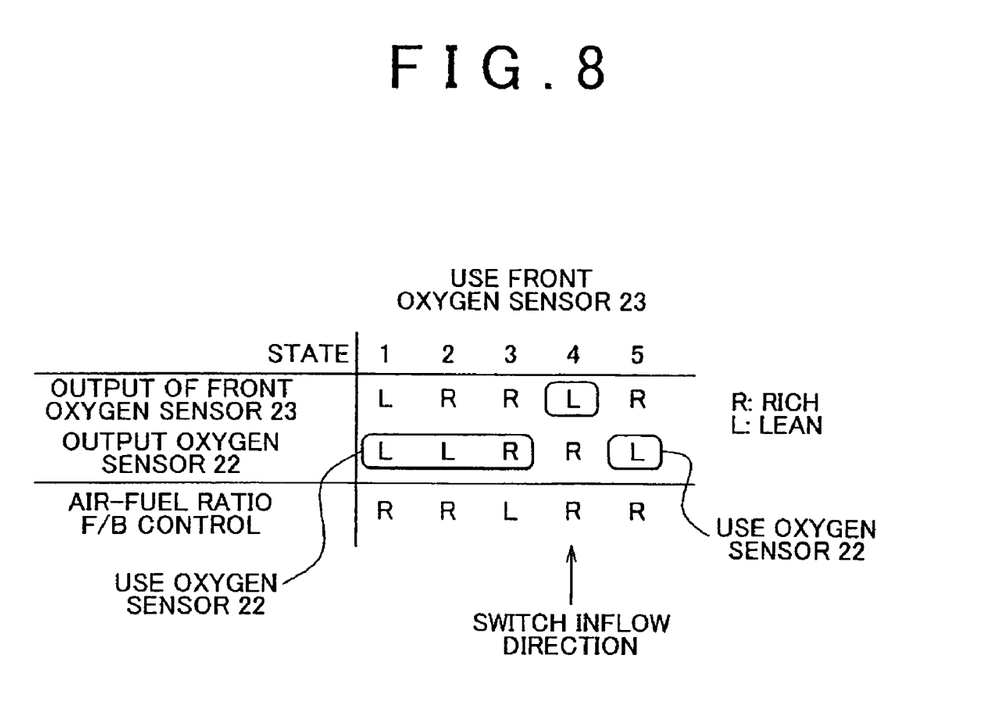
FIG. 8 is a chart schematically showing the output status of each of a front oxygen sensor and an oxygen sensor shown in FIG. 7 in accordance with the status of feedback control of air/fuel ratio.

FIG. 8 is a chart schematically showing the output status of each of the front oxygen sensor 23 and the oxygen sensor 22 in accordance with the status of feedback control of air/fuel ratio. In Status 1, the feedback control of air/fuel ratio is a rich control, and, at this time, the outputs of the front oxygen sensor 23 and the oxygen sensor 22 are both lean outputs. In Status 2 that follows, first, the output from the front oxygen sensor 23 changes to a rich output. Then, in Status 3, the output of the oxygen sensor 22 changes to a rich output, which causes the feedback control of air/fuel ratio to change to a lean control. Because none of these cases correspond to a case where the output of the front oxygen sensor 23 changes to a lean output during lean control, the output of the oxygen sensor 22 is used for sub-feedback control from Status 1 to Status 3.

On the other hand, because the feedback control is a lean control in Status 3, in Status 4, the output from the upstream oxygen sensor 23 is initially a lean output. This corresponds to a case where the output of the front oxygen sensor 23 changes to a lean output during the lean control. Thus, the sensor output that is used for sub-feedback control is switched at this time from the output of the oxygen sensor 22 to the output of the front oxygen sensor 23. At this time, the inflow direction switching valves 17A are simultaneously controlled to switch the direction of gas flowing into the front catalyst 11F to the opposite direction. Further, the feedback control of air/fuel ratio is changed to rich control with the sensor output status of Status 4. Then, in Status 5, the output of the front oxygen sensor 23 goes rich, and the output of the oxygen sensor 22 changes to a lean output, so the sensor output to be used for sub-feedback control is switched from the output of the front oxygen sensor 23 to the output of the oxygen sensor 22.

Figure 9:
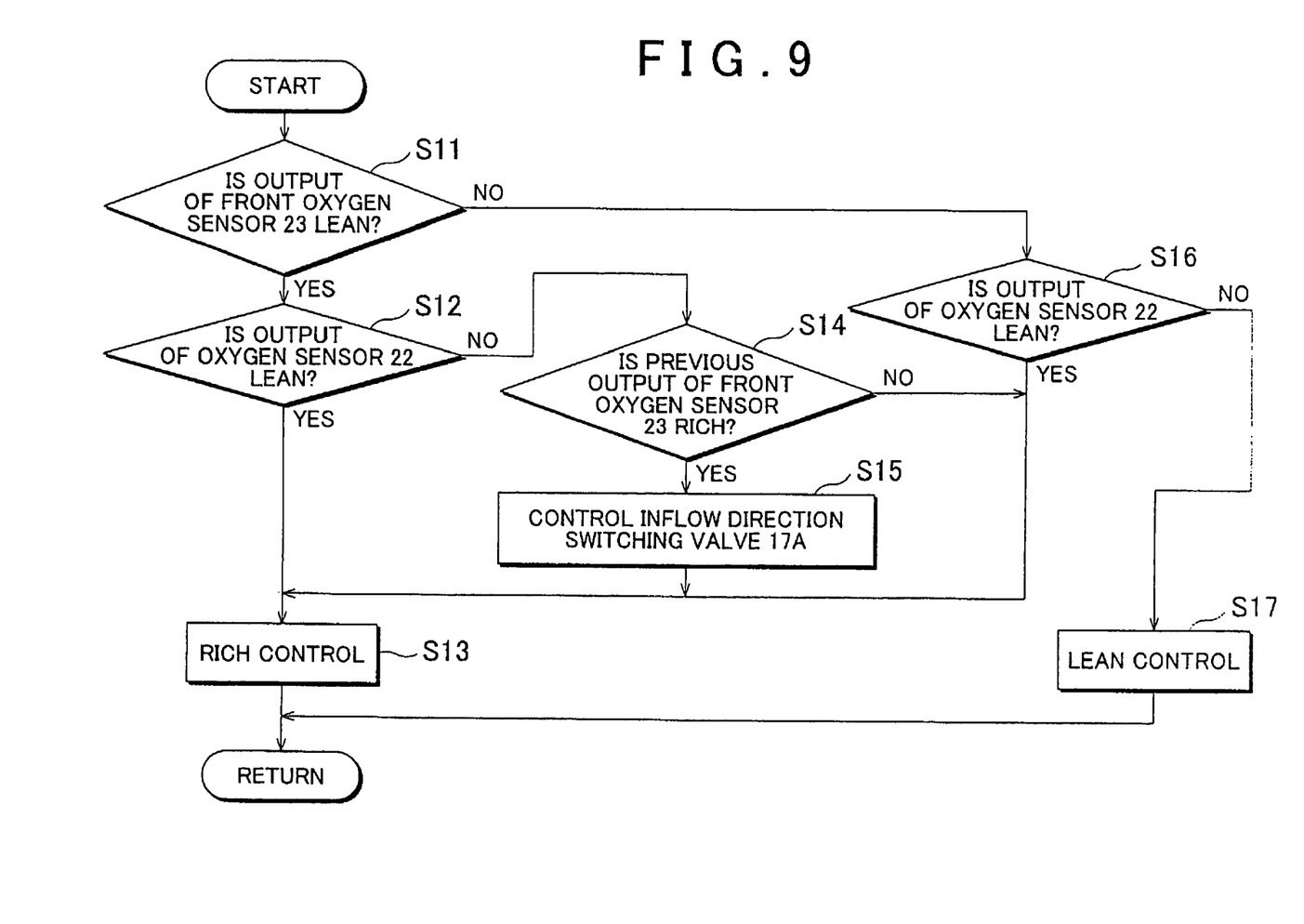
FIG. 9 is a flowchart showing feedback control of air/fuel ratio of the exhaust control device according to the sixth embodiment of the present invention.

FIG. 9 is a flowchart showing the feedback control of air/fuel ratio shown in FIG. 8. This flowchart also shows the inflow direction switching control of the inflow direction switching valves 17A at the same time. The CPU executes a process to determine whether the output of the front oxygen sensor 23 indicates that the exhaust gas A/F ratio is lean (step S11). If the determination in step S11 is positive, the CPU executes a process to determine whether the output of the oxygen sensor 22 indicates that the exhaust gas A/F ratio is lean (step S12). If the determination in step S12 is positive, the CPU executes a rich control (step S13). The result of these processes corresponds to Status 1 shown in FIG. 8 described above.

Alternatively, if the determination in step S11 is negative, the CPU executes a process to determine whether the output of the oxygen sensor 22 indicates that the exhaust gas A/F ratio is lean (step S16). If the determination in step S16 is positive, the CPU executes the rich control (step S13). The result of these processes corresponds to Status 2 shown in FIG. 8. On the other hand, if the determination in both step S11 and step S16 is negative, the CPU executes the lean control (step S17). The result of these processes corresponds to Status 3 shown in FIG. 8.

If the determination in step S11 is positive, and the determination in step S12 is negative, the CPU executes a process to determine whether the previous output of the front oxygen sensor 23 indicates that the exhaust gas A/F ratio is rich (step S14). If the determination in step S14 is positive, the CPU executes a process to control the inflow direction switching valves 17A, and switches the inflow direction of gas flowing into the front catalyst 11F (step S15). Further, the CPU executes the rich control (step S13). The result of these processes corresponds to Status 4 shown in FIG. 8. It should be noted that if the determination in step S11 is positive, the determination in step S12 is negative, and the determination in step S14 is negative, the process advances to step S13, where the CPU executes the rich control.

Alternatively, if the determination in step S11 is negative, and the determination in step S16 is positive, the CPU executes the rich control (step S13). The result of these processes corresponds to Status 5 shown in FIG. 8. In this way, when the output of the front oxygen sensor 23 changes to lean output when rich control is executed as the feedback control of air/fuel ratio, the output of the front oxygen sensor 23 is used for the sub-feedback control, and the direction of gas flowing into the front catalyst 11F is switched, thereby making it possible to minimize the emission of NOx from the front catalyst 11F. The above-described configuration makes it possible to restrain rich poisoning of the rear catalyst 12, and also realize the ECU 1F that minimizes the emission of NOx from the front catalyst 11F.

The embodiments described above are example embodiments of the present invention. However, the present invention is not limited to the example embodiments but may be modified in various ways without departing from the scope of the present invention.

What is claimed is:

1. An exhaust purification device for an internal combustion engine, comprising:
   a front catalyst provided in an exhaust passage of an exhaust system of the internal combustion engine that is longitudinally mounted in a vehicle;
   a rear catalyst arranged in series with the front catalyst, provided in the exhaust passage of the exhaust system downstream of the front catalyst; and
   a bypass pipe that communicates with the exhaust passage of the exhaust system upstream of the front catalyst, and communicates with the exhaust passage between the front catalyst and the rear catalyst, wherein
   the bypass pipe is arranged at a position that is spaced apart from the exhaust passage in a direction perpendicular to a vibration direction of the exhaust system that vibrates by a vibration of the internal combustion engine,
   the bypass pipe includes a first bypass passage that communicates with the exhaust passage upstream of the front catalyst and is extended in a direction perpendicular to a vibration direction in which vibration of the exhaust system is largest, a second bypass passage that communicates with the exhaust passage between the front catalyst and the rear catalyst and is extended in the direction perpendicular to the direction in which vibration of the exhaust system is largest, and a third bypass passage that connects the first bypass passage with the second bypass passage, and
   a flexible pipe is disposed in the exhaust passage between the first bypass passage and the second bypass passage.

2. The exhaust purification device according to claim 1, wherein the vibration direction of the exhaust system is horizontal with respect to a vertical direction of the internal combustion engine.

3. The exhaust purification device according to claim 1, wherein
   the flexible pipe is provided in the exhaust passage of the exhaust system, and connects the internal combustion engine with the front catalyst, and
   the bypass pipe is arranged at a position that is spaced apart from the exhaust passage of the exhaust system in a direction perpendicular to a vibration direction of the flexible pipe.

4. The exhaust purification device according to claim 1, wherein:
   the internal combustion engine has a plurality of cylinders separated into a plurality of banks, and the internal combustion engine performs a cylinder suspend operation in which operation of the internal combustion engine is performed in part of the plurality of banks;
   the exhaust system is branched out for each of the plurality of banks; and
   the bypass pipe communicates with the exhaust passage upstream of the front catalyst that is arranged in the branch of the exhaust system connected to the bank that remains operational during the cylinder suspend operation.

* * * * *